(12) United States Patent
Song et al.

(10) Patent No.: US 12,689,932 B2
(45) Date of Patent: Jul. 21, 2026

(54) METHODS FOR HANDLING PACKET FILTERS FOR INTERWORKING BETWEEN A SERVICE BASED ARCHITECTURE, SBA, NETWORK AND AN EVOLVED PACKET SYSTEM, EPS, NETWORK AS WELL AS CORRESPONDING DEVICES

(71) Applicant: Telefonaktiebolaget LM Ericsson (publ), Stockholm (SE)

(72) Inventors: Yumei Song, Gothenburg (SE); Hong Zhang, Gothenburg (SE); Susana Fernandez Alonso, Madrid (ES); Fuencisla Garcia Azorero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 95 days.

(21) Appl. No.: 18/835,262

(22) PCT Filed: Dec. 1, 2022

(86) PCT No.: PCT/EP2022/084069
§ 371 (c)(1),
(2) Date: Aug. 1, 2024

(87) PCT Pub. No.: WO2023/160849
PCT Pub. Date: Aug. 31, 2023

(65) Prior Publication Data
US 2025/0150885 A1      May 8, 2025

(30) Foreign Application Priority Data
Feb. 9, 2022    (EP) ..................................... 22382104
May 6, 2022    (EP) ..................................... 22382435

(51) Int. Cl.
*G06F 15/16* (2006.01)
*H04L 41/0894* (2022.01)
(Continued)

(52) U.S. Cl.
CPC ......... *H04W 28/02* (2013.01); *H04L 41/0894* (2022.05); *H04L 47/20* (2013.01); *H04L 12/1407* (2013.01)

(58) Field of Classification Search
CPC .... H04W 28/02; H04L 41/0894; H04L 47/20; H04L 12/1407
See application file for complete search history.

(56) References Cited

U.S. PATENT DOCUMENTS

| | | | |
|---|---|---|---|
| 11,388,141 | B1 | 7/2022 | Rupavatharam et al. |
| 2013/0021905 | A1 | 1/2013 | Schramm |

(Continued)

OTHER PUBLICATIONS

U.S. Office Action dated Nov. 4, 2025 for U.S. Appl. No. 18/836,974, consisting of 24 pages.
(Continued)

*Primary Examiner* — Joseph R Maniwang
(74) *Attorney, Agent, or Firm* — Weisberg I.P. Law, P.A.

(57)            ABSTRACT

A method performed by a session management function, SMF, in a service based architecture, SBA, network for handling packet filters related to a session of User Equipment, UE, in the SBA network. The method includes transmitting a policy control request in relation to said session of said UE with said SBA network; receiving a policy control response, wherein said policy control response includes applicable packet filters for said session of said UE with said SBA network; determining that a number of the applicable packet filters received exceeds a number of packet filters supported by said UE; and transmitting an update message with rule report comprising a failure code indicating that at (Continued)

least one of said applicable packet filters cannot be installed or updated due to that a maximum number of packet filters has been reached.

19 Claims, 6 Drawing Sheets

(51) Int. Cl.
| | |
|---|---|
| *H04L 47/20* | (2022.01) |
| *H04W 28/02* | (2009.01) |
| *H04L 12/14* | (2006.01) |

(56) References Cited

U.S. PATENT DOCUMENTS

| | | | |
|---|---|---|---|
| 2019/0357301 A1 | 11/2019 | Li et al. | |
| 2021/0226807 A1 | 7/2021 | Qiao et al. | |
| 2022/0338105 A1 | 10/2022 | Kopperla et al. | |
| 2023/0073796 A1 | 3/2023 | Du et al. | |
| 2024/0163938 A1* | 5/2024 | Qiao | H04W 4/24 |

OTHER PUBLICATIONS

European Intention to Grant dated Jan. 30, 2025 for Application No. 22823085.0, consisting of 40 pages.
3GPP TS 38.523-1 V16.10.0; 3rd Generation Partnership Project; Technical Specification Group Radio Access Network; 5GS; User Equipment (UE) conformance specification; Part 1: Protocol (Release 16); Dec. 2021, consisting of 3422 pages.
International Search Report and Written Opinion dated Feb. 13, 2024 for International Application No. PCT/EP2022/084082 filed Dec. 1, 2022; consisting of 10 pages.
3GPP TS 24.008 V17.5.0; 3rd Generation Partnership Project; Technical Specification Group Core Network and Terminals; Mobile radio interface Layer 3 specification; Core network protocols; Stage 3 (Release 17); Dec. 2021; consisting of 800 pages.
3GPP TSG-CT WG1 Meeting #111, C1-183543, Title: Indicating Maximum Number of Packet Filters per PDU Session; Source: Qualcomm Incorporated, InterDigital, Intel; Spec: 3GPP TS 24.501 V1.1.1; Agenda item: 15.2.2.7; Document for: Agreement; Date and Location: May 21-25, 2018, Osaka, Japan; consisting of 12 pages.
3GPP TSG-CT Meeting #91e, CP-210107; Title: CR pack on 5GProtoc16; Source: CT1; Date and Location: Mar. 18-24, 2021, E-Meeting; consisting of 2 pages.

3GPP TSG-CT3 Meeting #120e, C3-221137; Title: Handling of number of packet filters when interworking with EPS; Source to WG: Ericsson; Source to TSG: CT3; Work item code: 5GS_Ph1-CT, TEI17; Date and Location: Feb. 17-25, 2022, E-Meeting; consisting of 62 pages.
3GPP TSG-CT WG1 Meeting #128-e; C1-211433; Title: Local IP address in TFT negotiation in 5GS for 5G-4G interworking; Source to WG: Huawei, HiSilicon; Source to TSG: C1; Work item code: 5GProtoc16; Date and Location: Feb. 25-Mar. 5, 2021, Electronic meeting; consisting of 23 pages.
International Search Report and Written Opinion dated Feb. 22, 2023 for International Application No. PCT/EP2022/084069 filed Dec. 1, 2022; consisting of 10 pages.
3GPP TS 23.501 V17.3.0; 3rd Generation Partnership Project; Technical Specification Group Services and System Aspects; System architecture for the 5G System (5GS); Stage 2 (Release 17); Dec. 2021; consisting of 559 pages.
3GPP TS 23.503 V17.3.0; 3rd Generation Partnership Project; Technical Specification Group Services and System Aspects; Policy and charging control framework for the 5G System (5GS); Stage 2 (Release 17); Dec. 2021; consisting of 144 pages.
3GPP TS 24.008 V17.5.0; 3rd Generation Partnership Project; Technical Specification Group Core Network and Terminals; Mobile radio interface Layer 3 specification; Core network protocols; Stage 3 (Release 17); Dec. 2021; consisting of 458 pages.
3GPP TS 24.501 V17.5.0; 3rd Generation Partnership Project; Technical Specification Group Core Network and Terminals; Non-Access-Stratum (NAS) protocol for 5G System (5GS); Stage 3 (Release 17); Dec. 2021; consisting of 916 pages.
3GPP TS 29.512 V17.5.0; 3rd Generation Partnership Project; Technical Specification Group Core Network and Terminals; 5G System; Session Management Policy Control Service; Stage 3 (Release 17); Dec. 2021; consisting of 249 pages.
3GPP TSG-CT3 Meeting #120e; C3-221137; Title: Handling of number of packet filters when interworking with EPS; Source to WG: Ericsson; Source to TSG: CT3; Work item code: 5GS_Ph1-CT, TEI17; Date and Location: Feb. 17-25, 2022, E-Meeting; consisting of 56 pages.
3GPP TSG-SA2 Meeting # 147E (e-meeting), S2-2107205; Title: Dynamic Policy Control for 5GC Individual MBS Traffic Delivery; Source: Ericsson; Document for: Discussion/ Agreement; Agenda Item: 8.9; Work Item/Release: 5MBS / Rel-17; Date and Location: Oct. 18-22, 2021, Elbonia; consisting of 25 pages.
International Preliminary Report on Patentability dated Jan. 9, 2024 for International Application No. PCT/EP2022/084069 filed Dec. 1, 2022; consisting of 7 pages.

* cited by examiner

COMMUNICATION SYSTEM
QQ100

METHODS FOR HANDLING PACKET FILTERS FOR INTERWORKING BETWEEN A SERVICE BASED ARCHITECTURE, SBA, NETWORK AND AN EVOLVED PACKET SYSTEM, EPS, NETWORK AS WELL AS CORRESPONDING DEVICES

CROSS-REFERENCE TO RELATED APPLICATIONS

This application is a Submission Under 35 U.S.C. § 371 for U.S. National Stage Patent Application of International Application No.: PCT/EP2022/084069, filed Dec. 1, 2022 entitled "METHODS FOR HANDLING PACKET FIL-TERS FOR INTERWORKING BETWEEN A SERVICE BASED ARCHITECTURE, SBA, NETWORK AND AN EVOLVED PACKET SYSTEM, EPS, NETWORK AS WELL AS CORRESPONDING DEVICES," which claims priority to European Application No.: EP22382104.2, filed Feb. 9, 2022, and claims priority to European Application No.: EP22382435.0, filed May 6, 2022, the entireties of all of which are incorporated herein by reference.

INTRODUCTION

3GPP TS 23.501 ch5.7.1.4 states that in 5G, a User Equipment, UE, can indicate support of the number of packet filters for signaled QoS rules of the corresponding PDU session, i.e. during the PDU Session Establishment procedure or using the PDU Session Modification procedure as described in clause 5.17.2.2.2 after the first inter-system change from EPS to 5GS for a PDU Session established in EPS and transferred from EPS with N26 interface. It is the responsibility of the SMF to ensure that the sum of the Packet Filters used by all signaled QoS rules for a PDU Session does not exceed the number indicated by the UE.

3GPP TS 29.512 ch5.6.3.6 states that when the NF service consumer receives the number of supported packet filter for signaled QoS rules for the PDU session from the UE during the PDU Session Modification procedure after the first inter-system change from EPS to 5GS for a PDU Session established in EPS and transferred from EPS with N26 interface, the NF service consumer shall include the "NUM_OF_PACKET_FILTER" within the "repPolicyCtrl-ReqTriggers" attribute and the number of supported packet filter for signaled QoS rules within the "numOfPackFilter" attribute. This is only applicable to the interworking scenario as defined in Annex B.

The number of packet filters supported in Long Term Evolution, LTE, is limited to 16 per EPS bearer (24.008 ch10.5.6.12), wherein the number of supported packet filters can reach 240 assuming that 15 EPS bearers are supported for a PDN connection. The number of packet filters per PDU session can be up to 1024 in 5G (23.501 ch5.7.1.4). The above chapters from the 3GPP specifications have defined how to handle supported number of packet filters more than the maximum number of supported packet filters in 5GS and after first inter system change from EPS to 5GS in UE and also in SMF as well as PCF.

3GPP TS 24.501 ch6.4.1.3 states that at PDU Session Establishment Accept procedure, if interworking with EPS is supported for the PDU session, the SMF shall set in the PDU SESSION ESTABLISHMENT ACCEPT message:

a) the Mapped EPS bearer contexts IE to the EPS bearer contexts mapped from one or more QoS flows of the PDU session;

3GPP TS 24.501 ch9.11.4.8 defines the mapped EPS bearer contexts. When the parameter identifier indicates traffic flow template, the length and parameter contents field are coded from octet 2 as shown in figure 10.5.144 and table 10.5.162 of 3GPP TS 24.008, which limits the maximum number of packet filters to 16 per mapped EPS bearer context There currently exist certain challenge(s). It is not clear how to handle PDU sessions established in 5GS with more packet filters then supported in EPS, for signaled QoS rules during 5GS to EPS mobility procedures. This may result in service disturbance or delay for critical services, such as Delay critical services, MPS etc, during 5GS to EPS inter system change.

PCF may optionally update policy decisions during EPS interworking procedure if certain triggers are provisioned (e.g RAT type change). But there is no trigger that indicates that the supported number of packet filter changed, i.e. the supported number of packet filters is reduced, during 5GS to EPS mobility (e.g. RAT changes may occur within 5GS), and it is not guaranteed that PCF is aware of the change if no applicable policy control report triggers are provisioned before the EPS interworking procedure. Moreover, the RAT type change report to the PCF occurs after the interworking procedure has been triggered, that is, when the UE is already in 4G access. Thus service disruption could occur before the PCF can update the PCC Rules according to the packet filter demands Certain aspects of the disclosure and their embodiments may provide solutions to these or other challenges.

The present disclosure proposes a mechanism regarding how to handle Service Based Architecture, SBA, to Evolved Packets System, EPS, mobility for session established in 5GS with more than a predetermined number of packet filters. That is, with more packet filters that are supported in the EPS domain.

The underlying concept is that the PCF either indicates which packet filters to preserve, or that the PCF indicates some sort of priority for the packet filters. This allows the SMF to determine which packet filters to inactivate or disregard whenever the UE is to be handled in accordance with a fewer number of packet filters.

For example, a new mechanism may be introduced for Policy and Charging Control, PCC, rule provision that the PCF includes an indication for the packet filters of the PCC rule when EPS interworking is applicable.

The first option is that a new attribute, or new attributes, are introduced, one for each packet filter, for indicating whether the corresponding packet filter is to be preserved. Such a new attribute may, for example, be introduced in the FlowInformation to indicate that the packet filters of the Flow Description shall be preserved so that packet filters of the corresponding PCC rule are to be included in Traffic Flow Templates, TFT, of the mapped EPS bearers context.

Another option is that attributes are introduced, one for each packet filter, for indicating the priority of a corresponding packet filter. Such a new attribute may, for example, be introduced in the Flow Information to indicate the priority of preservation of the corresponding packet filters of the PCC rule for EPS interworking.

Yet another option is to introduce a new attribute in the PCC rule for indicating the priority of preservation, or preservation indication, for all packets filters in that corresponding PCC rule for EPS interworking.

An even further option is to reuse the PCC rule precedence to indicate the priority of the preservation of the packet filters of the PCC rule for EPS interworking.

Yet another option is that the SMF may make its own decision on whether or not to allocate packets filters based on local policy, for example based on operator policy or implementation. It is noted that this option may, or mar not, override the information received above from the PCF.

It is noted that a PCC rule may be considered a set of information elements enabling the detection of a service data flow and providing parameters for policy control and/or charging control. There may be two different types of PCC rules as defined in 3GPP TS 23.503.

The first type is related to dynamic PCC rules. These type of PCC rules may be dynamically provisioned by the PCF to the SMF. These PCC rules may be either predefined or dynamically generated in the PCF. Dynamic PCC rules may be installed, modified and removed at any time.

The second type is related to predefined PCC rules. These type of PCC rules may be preconfigured in the SMF. Predefined PCC rules may be activated or deactivated by the PCF at any time. Predefined PCC rules within the PCF may be grouped allowing the PCF to dynamically activate a set of PCC rules.

It is noted that the SMF may decide to use the information received from the PCF to decide which of the packets filters to allocate, irrespective of whether these packets filters are associated to the dynamic or predefined PCC rules.

On top of the above, it is noted that the PCF may include, or activate, the above described new attribute in the PCC rule only in case it is aware that there might be a situation in which said SBA network is interworking with an Evolved Packet System, EPS, network, for a particular UE.

The PCF may become aware of this particular aspect based on, for example, the Data Network Name, DNN, or the Single Network Slice Selection Assistance Information, S-NSSAI, that is received by the PCF during the random access procedure of the UE to the 5G network.

The S-NSSAI is an identifier for a Network Slice across the 5G core network, the 5G-RAN and the UE. The S-NS-SAI may be associated with a PLMN, for example PLMN ID, and may have network-specific values or have standard values. An S-NSSAI may be used by the UE in access network in the PLMN that the S-NSSAI is associated with.

In a telecommunication network, Data Networks may be identified using a DNN. The DNN is typically in the form of an Access Point Name, APN, or the like. In 5G, the Data Network Name, DNN, may be equivalent to an APN in EPS.

In a detailed example, the inventors have found that it might be beneficial if the SMF provides a policy update to the PCF indicating that one or more PCC rules, or one or more packet filters, are invalid after 5GS to EPS mobility due to the reasons that either all packet filters in the PCC rule are removed, i.e. the rule is inactive, or that the number of supported packet filters in the EPS network are exceeded.

In a further example, the SMF may provide a policy control message at 5GS to EPS mobility to indicate that the supported maximum number of packet filters has been reduced. This could be done by reusing the existing policy control request trigger, i.e. NUM_OF_PACKET_FILTER. For a PDU session established in 5GS or established in EPS but for which an inter-system change from EPS to 5GS occurred in the past, with more than the maximum number of supported packet filters for signaled QoS rules, after 5GS to EPS mobility, the SMF may report policy control request trigger NUM_OF_PACKET_FILTER and may set the number of supported packet filters to 16 per EPS bearer, or 240 per PDN connection assuming that 15 EPS bearers are supported for a single PDN connection. Another option is to introduce a new policy control request trigger NO_NU- M_OF_PACKET_FILTER. For a PDU session established in 5GS or established in EPS but for which an inter-system change from EPS to 5GS occurred in the past with more than the maximum number of packet filters for signaled QoS rules, after 5GS to EPS mobility, the SMF may report policy control request trigger NO_NUM_OF_PACKET_FILTER. When the PCF receives such a trigger report, it may imply that the supported maximum number of packet filters is 16 per PDN connection. In the above, the number of 16 is explicitly mentioned as that may be implemented in conventional EPS systems, i.e. 16 packet filters per EPS bearer and 15 EPS bearers per PDN connection. However, any number lower than the number supported by 5GS may be applicable.

In a further detailed example a failure code may be introduced, for example for indicating that a PCC rule can't be installed or updated due to the situation that the number of packet filters have exceeded the maximum number of supported packet filters for a PDU session.

Certain embodiments may provide one or more of the following technical advantage(s). The present disclosure provides guidance to the SMF to determine which packet filters to maintain at inter system change from 5GS to EPS. This helps to avoid service disturbance or delay that may be caused by no being able to transfer all packet filters of installed PCC rules to the corresponding EPS bearer due to the limitation of the maximum number of packet filters per PDN connection in EPS.

Another advantage of the present disclosure is that it may make the PCF aware of removed, or inactivated, PCC rules due to the fact that none of the packet filters of the corresponding PCC rule can be transferred to an EPS bearer context for the scenario that in 5GS PDU session established with the number of packet filters for signaled QOS rules is more than a predetermined number of packet filters, for example sixteen packet filters. A PCC rule error report with an explicit failure code may be generated to indicate the removal, or inactivation, of a PCC rule due to the situation that the number of packet filters exceed the maximum number of packet filters allowed in EPS, after the 5GS to EPS mobility. The PCF is then aware of the situation and can make proper policy decisions as a result thereof.

With respect to the above, it is noted that the PCC rules may not necessarily be removed or inactivated. The PCC rules may still be kept active, but may be marked by any means possible. The SMF may then inform the PCF with respect to the marked PCC rules, irrespective of whether the PCC rules have been removed, inactivated or kept active.

Yet an additional benefit of the invention is that the SMF may proactively notify the PCF about the change in supported number of packets filters after the 5GS to EPS mobility such that the PCF is able to make proper policy decisions thereafter based on the updated number of supported packet filters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

ADDITIONAL EXPLANATION

Some of the embodiments contemplated herein will now be described more fully with reference to the accompanying drawings. Embodiments are provided by way of example to convey the scope of the subject matter to those skilled in the art. Additional information may also be found in the document(s) provided in the Appendix.

Figure 1:
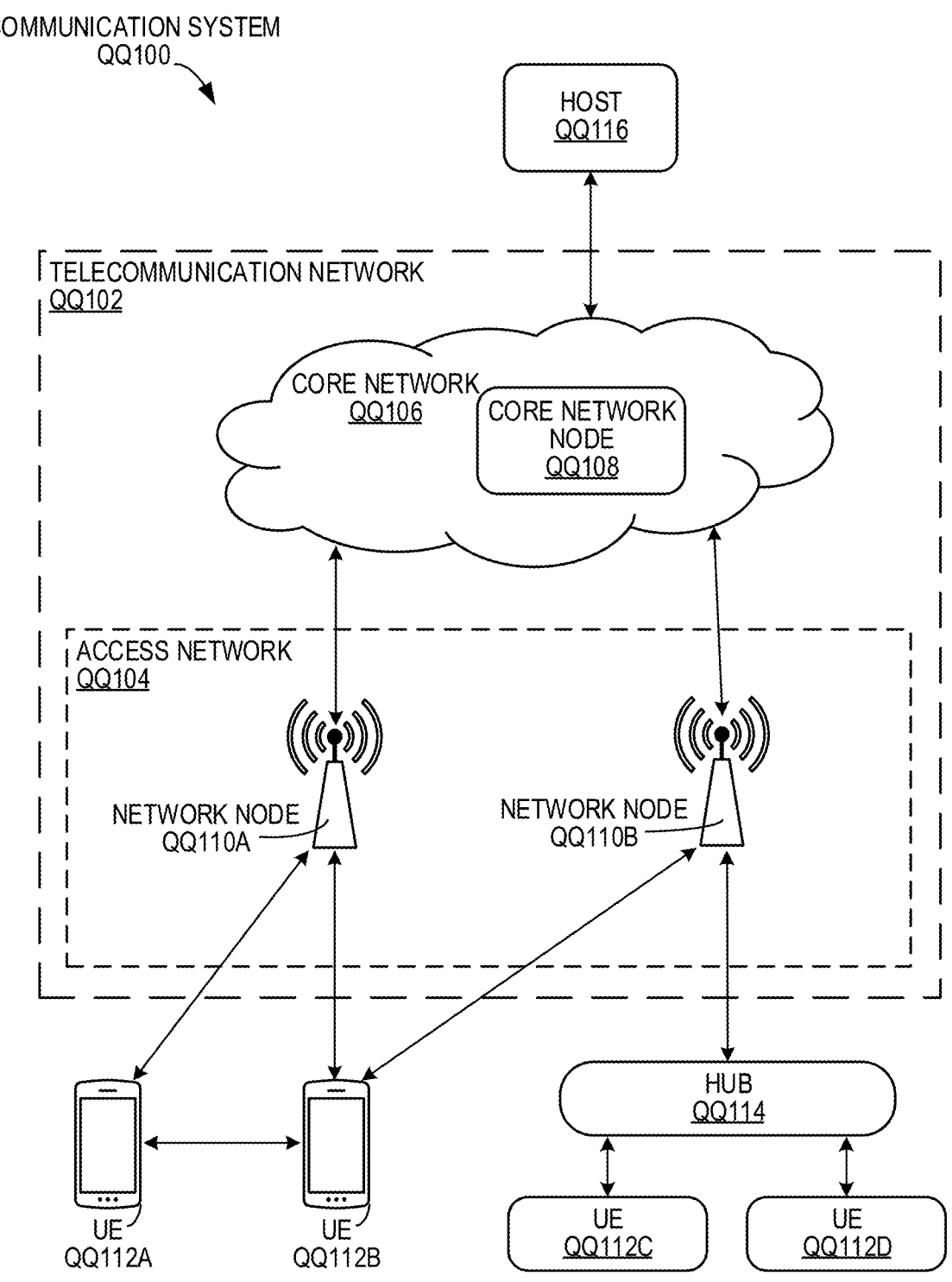
FIG. 1 shows an example of a communication system QQ100 in accordance with some embodiments.

FIG. 1 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3$^{rd}$ Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

Figure 2:
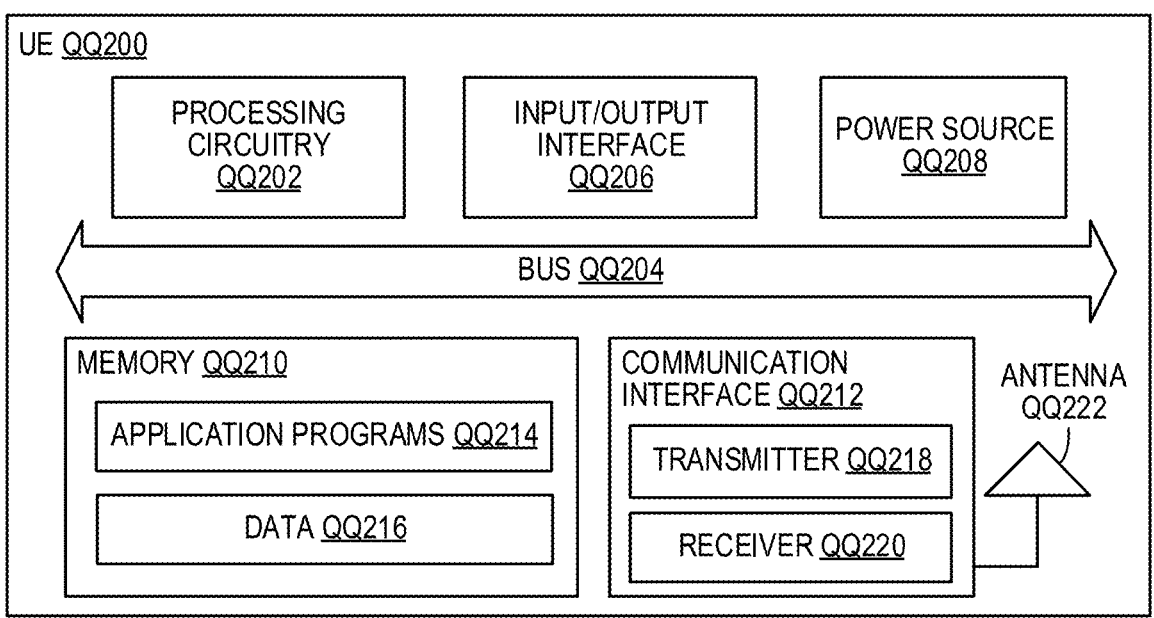
FIG. 2 shows a UE QQ200 in accordance with some embodiments.

FIG. 2 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the $3^{rd}$ Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 2. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 2.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 3:
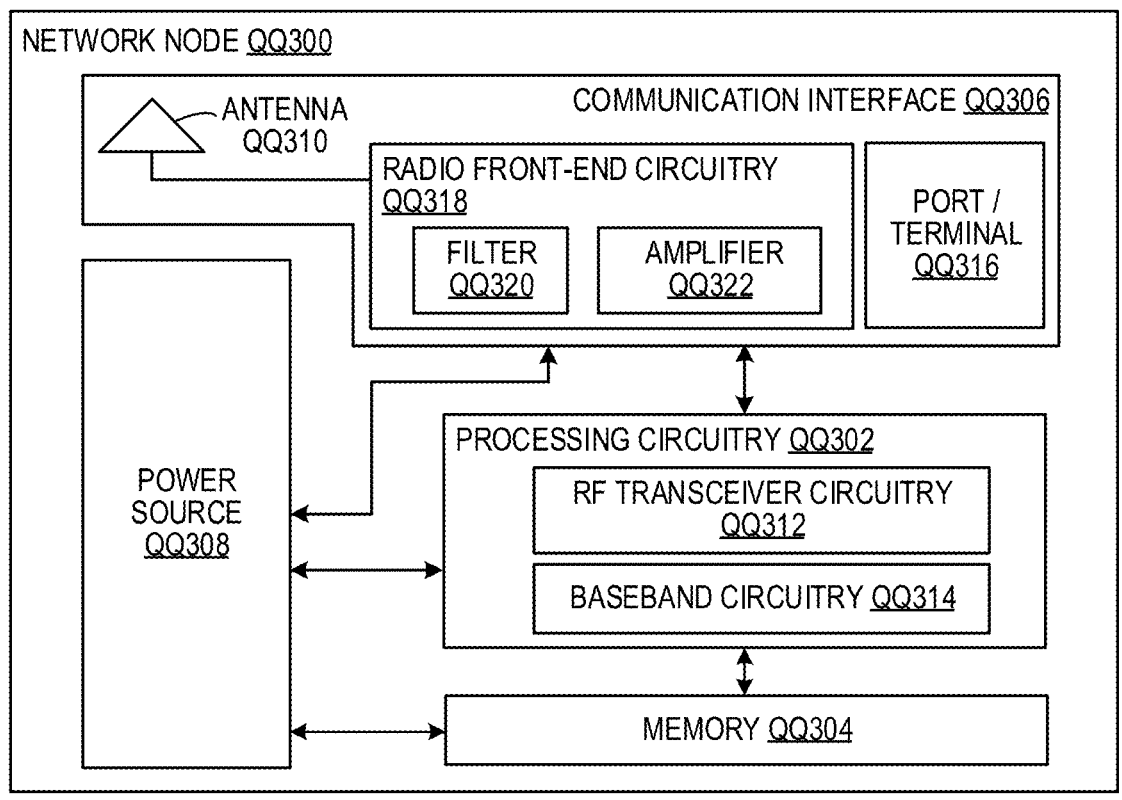
FIG. 3 shows a network node QQ300 in accordance with some embodiments.

FIG. 3 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)). The QQ300 may be an SMF or a PCF in accordance with the present disclosure.

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 3 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 4:
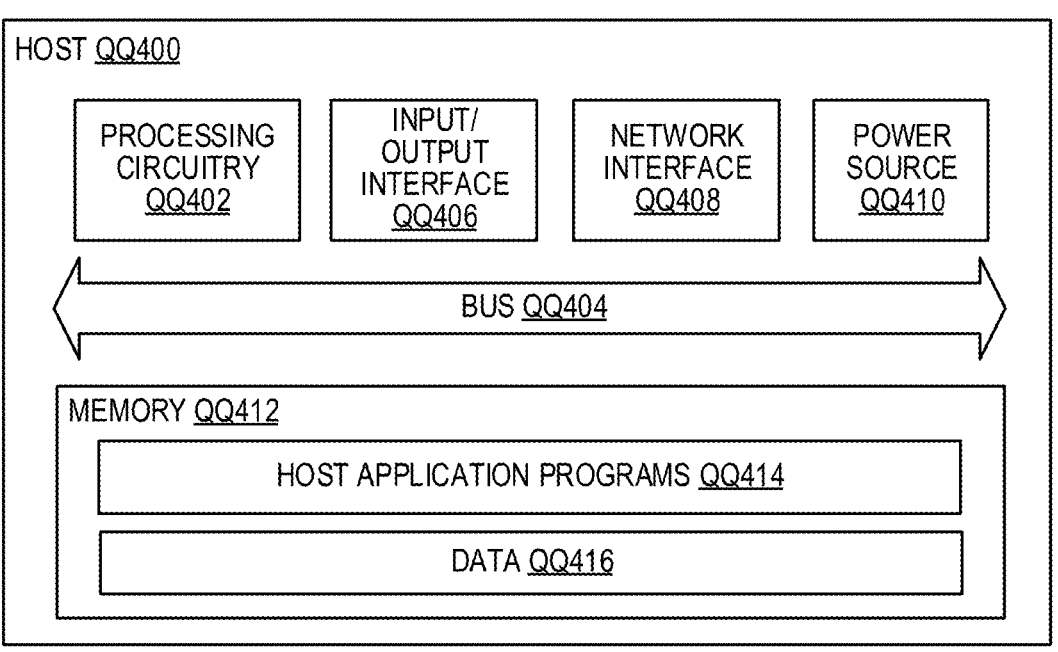
FIG. 4 is a block diagram of a host QQ400, which may be an embodiment of the host QQ116 of FIG. 1, in accordance with various aspects described herein.

FIG. 4 is a block diagram of a host QQ400, which may be an embodiment of the host QQ116 of FIG. 1, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 2 and 3, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 5:
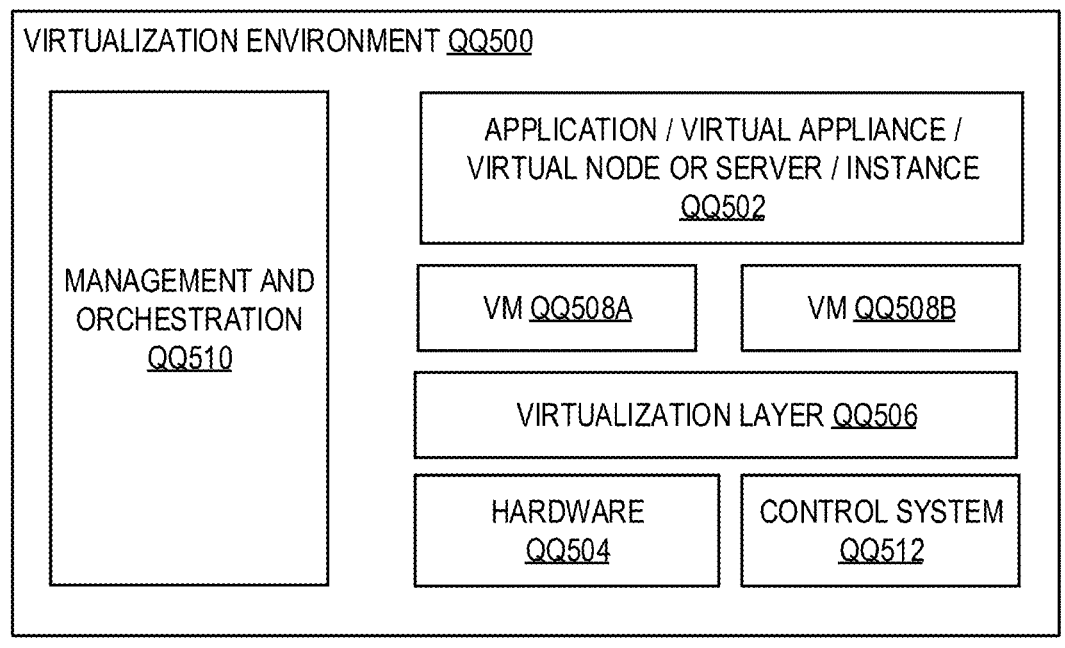
FIG. 5 is a block diagram illustrating a virtualization environment QQ500 in which functions implemented by some embodiments may be virtualized.

FIG. 5 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 6:
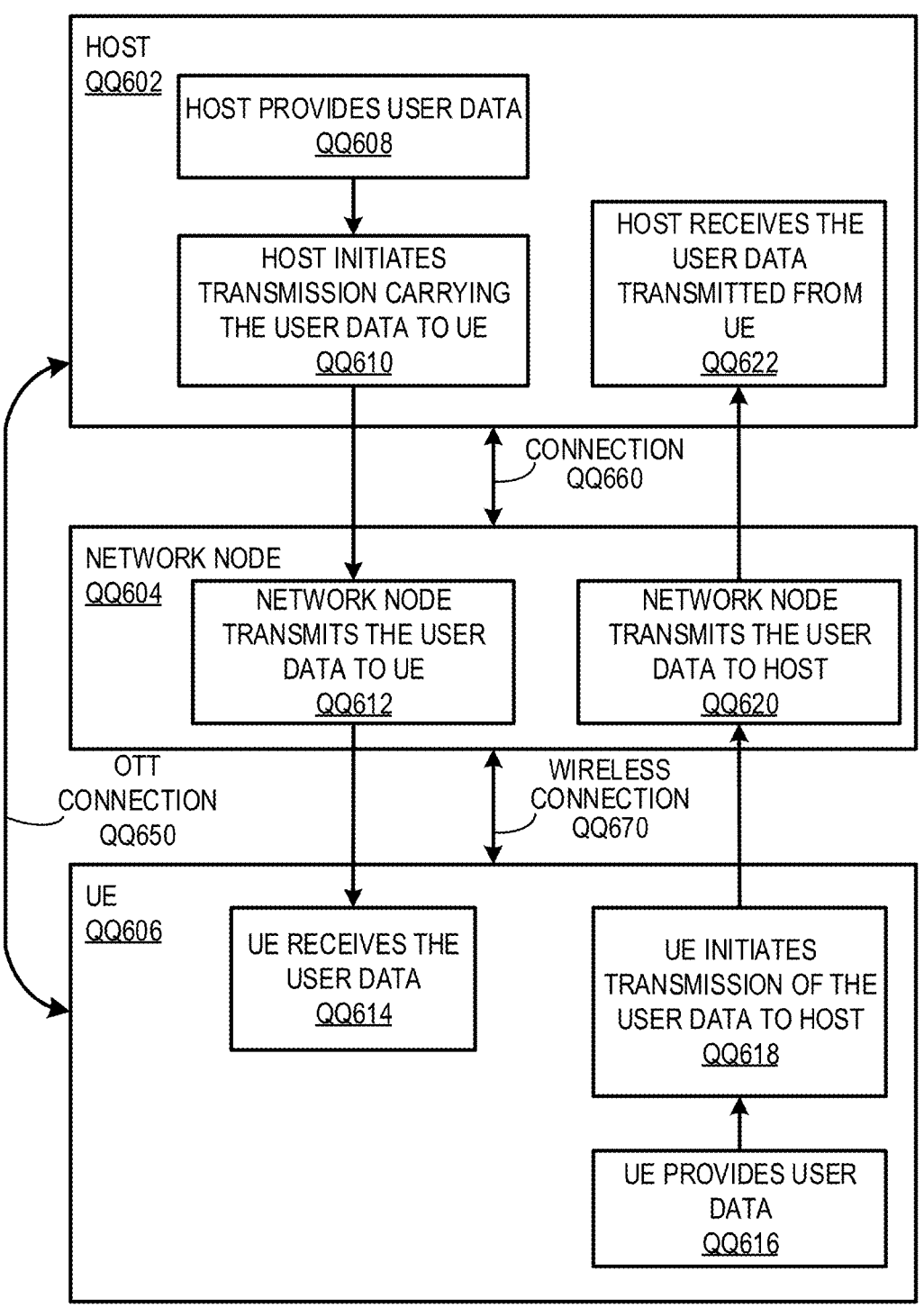
FIG. 6 shows a communication diagram of a host QQ602 communicating via a network node QQ604 with a UE QQ606 over a partially wireless connection in accordance with some embodiments.

FIG. 6 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 1 and/or UE QQ200 of FIG. 2), network node (such as network node QQ110a of FIG. 1 and/or network node QQ300 of FIG. 3), and host (such as host QQ116 of FIG. 1 and/or host QQ400 of FIG. 4) discussed in the preceding paragraphs will now be described with reference to FIG. 6.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 1) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Figure 7:
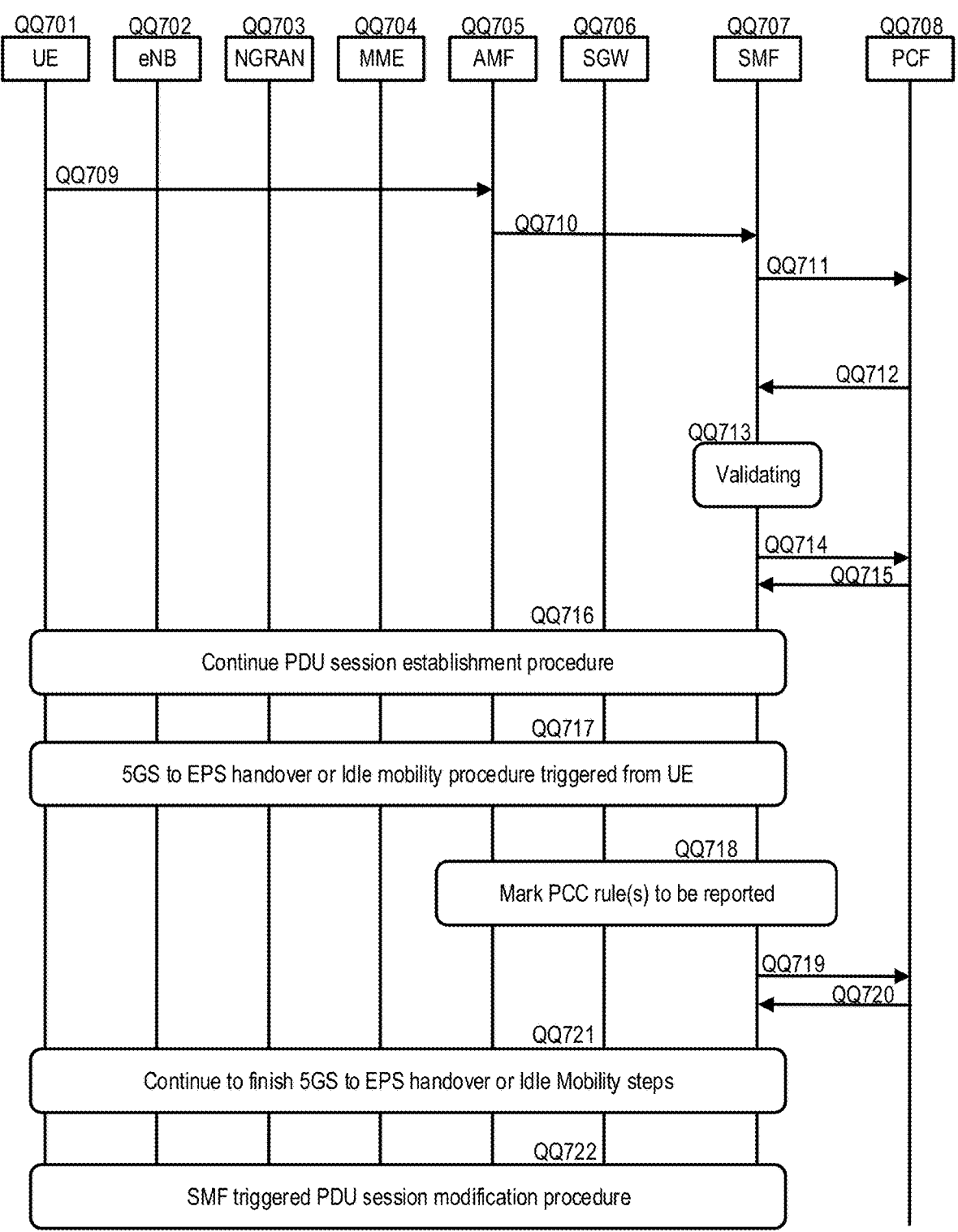
FIG. 7 shows an example of a flow chart in accordance with the present disclosure.

FIG. 7 shows an example of a flow chart in accordance with the present disclosure.

It is noted that, in accordance with the present disclosure, the SMF may have so-called Packet Data Network, PDN, Gateway Control plane, PGW-C functionality embedded therein. The PGW-C controls the functionality performed by an assigned PGW-U when control and user plane separation is in place. When a subscriber establishes an EPS bearer to a given PDN, the PGW-C selects and controls the point of attachment to that PDN for the life of the EPS bearer. Responsibilities include resource management for bearer resources, bearer binding, subscriber IP address management and mobility support. The use of SMF having PGW-C functionality, allows the policy control and charging rules function, PCRF, used for policy control in the Evolved Packet Core, EPC, to be replaced by a new dual-mode policy management system that supports 5G-enabled devices regardless of the access technology currently used.

The flow chart is directed to a method performed by a session management function, SMF, in a service based architecture, SBA, network for handling packet filters when said SBA network is interworking with an Evolved Packet System, EPS, network, wherein the number of supported packet filters in the SBA network exceeds the number of supported packet filters in the EPS network, the method comprising the steps of:

transmitting, by said SMF, to a Policy Control Function, PCF, in said SBA network, a policy control request in relation to a session request of a User Equipment, UE, with said SBA network;

receiving, by said SMF, from said PCF, a policy control response, wherein said policy control response comprises applicable packet filters for said session request of said UE with said SBA network, and comprising at least one of:

preservation information indicating which applicable packet filters to preserve when said SBA network is interworking with said EPS network;

priority information indicating priority information of said applicable packets filters that is to be taken into account when determining which applicable packet filters to preserve when said SBA network is interworking with said EPS network.

The above is described in more detail here below.

A User Equipment, UE, QQ701 may initiate the procedure by requesting a PDU Session Establishment QQ709 in 5GS. The UE may initiate the UE Requested PDU Session Establishment procedure by the transmission of a NAS message containing a PDU Session Establishment Request within the N1 SM container. The PDU Session Establishment Request may include a PDU session ID, Requested PDU Session Type, a Requested SSC mode, 5GSM Capability, PCO, SM PDU DN Request Container, Number Of Packet Filters, Header Compression Configuration, UE Integrity Protection Maximum Data Rate, Always-on PDU Session Requested, RSN and [PDU Session Pair ID. The present disclosure is directed to the number of Packet Filters.

The Number Of Packet Filters may indicate the number of supported packet filters for signaled QoS rules for the PDU Session that is being established. The number of packet filters indicated by the UE may be valid for the lifetime of the PDU Session.

For example, the UE may indicate the maximum number of packet filters that can be supported for the PDU session in a maximum number of packet filter Information Element, IE, of a PDU session establishment request message only if the UE is able to support more than the maximum number of packet filters in EPS, for this PDU session. In this regard, it is noted that, typically, the maximum number of packet filters is 16 per EPS bearer, wherein typically 15 EPS bearers are supported for a PDN connection established in an Evolved Packet System, EPS, network (4G). This may result in a maximum number of 240 packet filters in EPS.

Following the above, it is noted that the present disclosure is also applicable for a PDU Session Modification procedure instead of a PDU Session Establishment procedure, for the situation in which an EPS to 5GS handover occurs. In that particular scenario, the UE notifies, in the PDU Session Modification request, the 5G network that is supports more than the maximum number of packet filters supported by EPS.

The above described message is sent to the Access and Mobility Management Function, AMF, QQ705. One of the responsibilities of the AMF QQ705 is related to registration management. Registration management allows a UE QQ701 to register and deregister with the 5G network.

In a next step QQ710, the AMF QQ705 may send a PDU Session Create Context request towards a Session Management Function, SMF, QQ707. The PDU Session Create Context request is, for example, the Nsmf_PDUSession_

CreateSmContext Request and it may include the PDU Session Establishment Request that was initially sent by the UE QQ701. One of the responsibilities of the SMF is managing the PDU sessions of a UE, for example creating, updating and removing Protocol Data Unit, PDU, sessions and managing session context with the User Plane Function, UPF.

The SMF QQ707 may then transmit, to a Policy Control Function, PCF, QQ708 in said 5G network, a policy control request in relation to the session request of the UE QQ701. The policy control request is, for example, an Npcf_SM-PolicyControl_Create Request or an Npcf_SMPolicyControl_Update Request.

The Policy Control Service may perform provisioning, update and removal of session related policies and PCC rules by the Policy Control Function, PCF, QQ708 to the NF service consumer, for example the SMF QQ707. The Policy Control Service can be used for charging control, policy control and/or application detection and control. Session Management Policy Control Service applies to the cases where the SMF QQ707 interacts with the PCF QQ708 in a non-roaming scenario, the Visited SMF interacts with the Visited PCF in the local breakout roaming scenario and the Home SMF interacts with the Home PCF in the home-routed scenario.

Based on the received policy control request, the PCF QQ708 may transmit a policy control response QQ712 back to the SMF QQ707. The policy control response is, for example, an Npcf_SMPolicyControl_Create Response or an Npcf_SMPolicyControl_Update Response. Such a response includes Policy Decisions. The present disclosure is directed to the concept that the response comprises additional packet filter information, which additional packet filter information indicates to the SMF QQ707 how to deal with an excess number of packet filters in 4G-5G interworking scenarios. That is, it provides information to the SMF QQ707 which packet filters to "keep" and which packet filters to disregard in order to reduce the total number of packet filters back to the number that is allowed in the EPS network, for example 16 packet filters per EPS bearer. This is explained in a bit more detail here below.

The additional packet filter information may, for example, include any of preservation information which indicates which applicable packet filters to preserve when said SBA (5G) network is interworking the EPS network and/or priority information which indicates priority information of the applicable packet filters that is to be taken into account when determining which applicable packet filters to preserve when the SBA (5G) network is interworking with the EPS network.

It is noted that the PCF may determine that the SBA network is interworking with an Evolved Packet System, EPS, network based on, for example, the Data Network Name, DNN, or the Single Network Slice Selection Assistance Information, S-NSSAI, that is received by the PCF, for example during the random access procedure of the UE to the 5G network.

In an example, the preservation information may be included as an attribute in the FlowInformation, for example as shown below.

| Attribute name | Data type | P | Cardinality | Description | Applicability |
|---|---|---|---|---|---|
| . . . | | | | | |
| packFiltPrsv | boolean | O | 0 . . . 1 | When present and set to TRUE, The packet filter is to be preserved at EPS interworking procedures, which means the packet filter shall be included in the TFT of "mapped EPS bearer contexts". The default value "FALSE" shall apply, if the attribute is not present and has not been supplied previously (Note) | |

The PCF QQ708 may, for example, ensure that for all the dynamic PCC rules of a PDU session, the number of preserved packet filters contained within the "flowDescription" attribute or the "ethFlowDescripiont" attribute with the "packetFilterUsage" set to true does not exceed the value of supported by EPS, for example 16 per EPS bearer or 240 in total considering 15 EPS bearers.

In an example, the priority information may be included as an attribute in the FlowInformation, for example as shown below.

by using an attribute called packFiltPrsv which may be of a Boolean type. If present and set to TRUE, the packet filter(s) of the corresponding PCC rule may be preserved at EPS interworking procedures, i.e. the packet filter(s) may be included in the Traffic Flow Template, TFT, of the mapped EPS bearer contexts. The default value FALSE may apply if the attribute is not present and/or has not been supplied previously.

The preservation information may also be directed to reusing the "precedence" of the PCC rule to determine the

| Attribute name | Data type | P | Cardinality | Description | Applicability |
|---|---|---|---|---|---|
| . . . | | | | | |
| packFiltPrio | Uinteger | O | 0 . . . 1 | The priority of the packet filter to be preserved at EPS interworking procedures. Lowerst value means the highest priority. If this attribute is omitted, it means the packet filter is not prioritized and might be discarded at EPS interworking procedures. | |

The SMF QQ707 may, for example, use the "packFiltPrio" attribute in order to prioritize the packet filters to be preserved from those provisioned for all the dynamic PCC rules of a PDU session. Only the packet filters with higher priority are preserved. The higher the value of the packFiltPrio attribute, the lower the precedence of the packet filter.

In a further example, the preservation information may be included as an attribute in the definition of the PCC rule, for example as shown below.

order in which packet filters of the PCC rule is applied relative to the packet filters of other PCC rules within the same PDU session for EPS interworking, or reusing the "precedence" of the PCC rule to determine whether the PCC rule should be preserved at EPS interworking.

During the step Validating, as indicated with reference numeral QQ713, the SMF QQ707 may determine whether the number of packet filters received from the PCF QQ708 can be supported. The SMF QQ707 may report a failure, i.e.

| Attribute name | Data type | P | Cardinality | Description | Applicability |
|---|---|---|---|---|---|
| . . . | | | | | |
| packFiltPre | Uinteger | O | 0 . . . 1 | Determines the order in which packet filters of this PCC rule is applied relative to packet filters of other PCC rules within the same PDU session for EPS interworking. | |

The "packFiltPre" attribute may be used to specify the precedence of the packet filters of the PCC rule among packet filters of all PCC rules associated with the PDU session for EPS interworking. It may, for example, include an integer value in the range from 0 to 1024 (decimal). The higher the value of the "packFiltPre" attribute, the lower the precedence of packet filters of that PCC rule is.

Alternatively, the PCC rule could include a flag, which would indicate whether the PCC rule should be preserved at EPS interworking. This may, for example, be accomplished a PCC Rule failure, back to the PCF QQ708 in case the validating fails. The validation step may include validating that the total number of packet filters of the PDU session does not exceed the received Number of Packet Filter as initially received from the UE QQ701 in the PDU Session Establishment or Modification Request message. The validation may also, or alternatively, be directed to validate that the total number of preserved packet filters of the PDU session has reached the maximum number of packet filter preservations for EPS interworking. This is explained in more detail here below.

Multiple failure codes may be applicable and may be transmitted QQ714 back to the PCF QQ708, as shown in the table here below. It is noted that the first two failure codes may be transmitted as a result of the validating step as indicated by reference numeral QQ713 The third failure code here below may be transmitted as a result of the step as indicated with reference numeral QQ718.

At a certain moment in time, a 5GS to EPS handover or Idle mobility procedure may be triggered from the UE QQ701, as indicated with the reference numeral QQ717. This may trigger the SMF QQ707 to mark PCC rule(s) that are to be deactivated or being kept active, as indicated with reference numeral QQ718. The PCC rules for which none of its corresponding packet filters are to be preserved for 5GS to EPS interworking may be marked as to become deactivated or kept being active. This example is directed to this

| Enumeration value | Description | Applicability |
|---|---|---|
| . . . | | |
| MAX_NR_PACKET_FILTER | Indicates that the PCC rule could not be successfully installed (for those provisioned from the PCF), or updated (for those already successfully installed) due to the fact that the maximum number of packet filters of the PDU session has been reached. | |
| MAX_NR_PRSV_PACKET_FILTER | Indicates that the PCC rule could not be successfully installed (for those provisioned from the PCF), or updated (for those already successfully installed); Or the PCC rule is installed/updated without packet filter preservation indication, due to the fact that the maximum number of preserved packet filters of the PDU session has been reached. This is only applicable when UE registers in 5GS for 5GS and EPS interworking scenario. | |
| PACKET_FILTER_NOT_PRESERVED | Indicates that the PCC rule is removed or kept active at 5GS to EPS mobility due to no packet filters of the PCC rule is not preserved | |

It is noted that the first indicated failure code, i.e. directed to the concept that the number of packet filters exceeds the number as initially indicated by the UE in the corresponding PDU Session Establishment request is not a failure code that is specifically directed to an EPS interworking scenario.

That is, this particular scenario may be directed to a method performed by a Session Management Function, SMF, in a Service Based Architecture, SBA, network for handling packet filters related to a session of User Equipment, UE, in said SBA network, the method comprising the steps of transmitting, by said SMF, to a Policy Control Function, PCF, in said SBA network, a policy control request in relation to said session of said UE with said SBA network and receiving, by said SMF, from said PCF, a policy control response, wherein said policy control response comprises applicable packet filters for said session request of said UE with said SBA network, and determining, by said SMF, that the number of packet filter received from the PCF exceeds a number of packet filters supported by the UE, and transmitting, by said SMF, to said PCF, a failure code, i.e. a PCC rule report failure code, indicating that one or more packet filters could not be installed or updated due to the reason that the maximum number of packet filters has been reached. It is noted that, in this regard, the number of packet filters supported by the UE may be communicated in the originating PDU Session Establishment Request message as indicated above or, alternatively, in a PDU Session Modification Request message. The above is explained in more detail with respect to FIG. 8.

Based on the received failure code, the PCF QQ708 may then determine new policy decisions and may provide these back to the SMF QQ707, as indicated by the reference numeral QQ715.

In addition to the above, the procedure may continue QQ716 in the PDU Session Establishment procedure, wherein the SMF QQ707 may take into account the PCC rule's packet filter preservation indication when handling the Traffic Flow Template, TFT, of mapped EPS bearer contexts.

third failure code as disclosed in the table here above, i.e. PACKET_FILTER_NOT_PRESERVED.

It is noted that the SMF QQ707 may decide which whether or not to allocate packet filters based on operator policy or implementation. The SMF QQ707 may then, subsequently, inform the PCF about its decision.

In addition to the above, the SMF QQ707 may update or notify QQ719 the PCF QQ708 with respect to the updated maximum number of packet filters. For example, the SMF QQ707 may send an SMPolicyControl_Update Request to the PCF which includes Policy Control Report Triger "NO_NUM_OF_PACKE_FILTER" indicating that the number of packet filter per PDN connection has changed, i.e. is reduced to the number of packet filters supported by EPS. The maximum number of supported packets filters in EPS may be 16 per EPS bearer, wherein up to 15 EPS bearers are supported per PDN connection. In addition, a PCC rule report may be provided with a failureCode set to PACKET_FILTER_NOT_PRESERVED, if applicable. In another example, the SMF may send an SMPolicyControl_Update Request to PCF includes Policy Control Report Triger "NUM_OF_PACKE_FILTER" and set "numPaketFilter" equal to 16, or 240, indicating that number of packet filters per EPS bearer has changed to 16 or indicating that the number of packet filters per PDN connection has changed to 240, respectively. In addition, a PCC rule report may be provided with a failureCode set to PACKET_FILTER_NOT_PRESERVED, if applicable The PCF QQ708 may respond with an SMPolicyControl_Update Response and may include new policy decisions, if necessary. This is indicated with reference numeral QQ720. The procedure may then continue to finish 5GS to EPS handover or Idle Mobility steps QQ721. In addition, An SMF triggered PDU Session Modification may be initiated resulted from the step QQ720, which is indicated with reference numeral QQ722.

Figure 8:
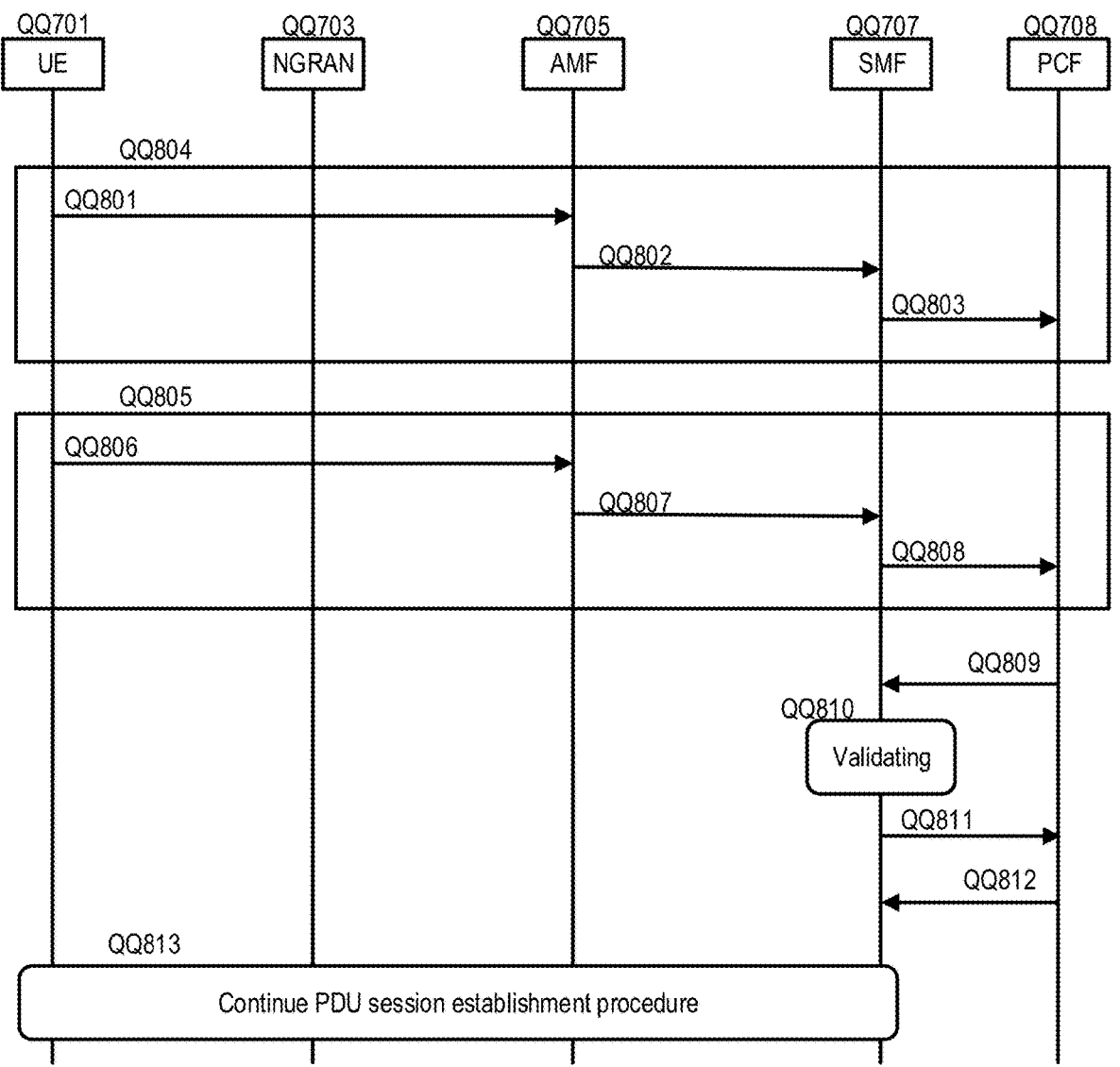
FIG. 8 discloses an example of how a Session Management Function, SMF QQ707, will tackle a situation in which the number of packet filters provided by the Policy Control Function, PCF, QQ708 exceeds the number of supported packet filters initially indicated by the UE QQ701.

FIG. 8 discloses an example of how a Session Management Function, SMF QQ707, will tackle a situation in which the number of packet filters provided by the Policy Control Function, PCF, QQ708 exceeds the number of supported packet filters initially indicated by the UE QQ701.

The present disclosure is directed to a new mechanism for the SMF QQ707 to generate a PCC rule failure report when the number of packet filters for all signaled QOS rules exceed the maximum number of UE supported packet filters, during PCC rule provision, so that the PCF is able to adapt policy decisions accordingly.

The underlying concept is that the SMF QQ707 introduced a failureCode for a PCC rule error report in SBA networks, like the 5GS, that the corresponding PCC rule can not be installed or updated due to the reasons that the maximum number of packets filters of all signaled QoS rules of the corresponding PDU session of the UE has been reached.

FIG. 8 discloses an example in which a User Equipment, UE, QQ701 sends a PDU Session Establishment request procedure for establishing a PDU session with the SBA network, as indicated with reference numeral QQ804, and shows an example in which a UE QQ701 sends a PDU Session Modification request procedure for modifying an ongoing PDU session with the SBA network, as indicated with reference numeral QQ805.

With respect to the PDU Session Establishment procedure QQ804, a PDU Session Establishment Request message may be send QQ801 to the AMF QQ705 via the NGRAN QQ703, like the gNodeb. Such a request message comprises an indication of the number of packet filters that are supported by the UE QQ701.

The UE QQ701 may thus initiate the UE Requested PDU Session Establishment procedure QQ804 by the transmission of a NAS message containing a PDU Session Establishment Request within the N1 SM container. The PDU Session Establishment Request includes a PDU session ID, Requested PDU Session Type, a Requested SSC mode, 5GSM Capability, PCO, SM PDU DN Request Container, [Number Of Packet Filters], [Header Compression Configuration], UE Integrity Protection Maximum Data Rate, [Always-on PDU Session Requested], [RSN] and [PDU Session Pair ID]. The present disclosure is directed to the [Number of Packet Filters] attribute.

The AMF QQ705 may then select an SMF QQ707 as described in clause 6.3.2 of TS 23.501 and clause 4.3.2.2.3. If the Request Type indicates "Initial request" or the request is due to handover from EPS or from non-3GPP access serving by a different AMF, the AMF QQ705 may store an association of the S-NSSAI(s), the DNN, the PDU Session ID, the SMF ID as well as the Access Type of the PDU Session.

when Request Type indicates "existing PDU Session", the AMF QQ705 may invoke the Nsmf_PDUSession_UpdateSMContext Request QQ807 as is the case for the PDU Session Modification request procedure QQ805.

It is noted that the PDU Session Request procedure QQ801 may comprise additional steps which are not shown in the figures for readability purposes. The SMF QQ701 may, for example, contact a UDM, for subscription retrieval or anything alike.

The present disclosure focuses on different steps in the procedure. For example, if dynamic PCC rules are to be used for the PDU session, the SMF QQ707 may perform PCF selection. If the initial Request Type indicates "Existing PDU Session" or "Existing Emergency PDU Session", like is the case for the PDU Modification Request procedure QQ805, the SMF may use the PCF that was already selected for that particular PDU session.

In any case, the SMF QQ707 may perform an SMPolicyControl request procedure, for example an SMPolicyControl_Create request or an SMPolicyControl_Update request as indicated with the reference numerals QQ803 and QQ808. The idea is to establish, or update, an SM Policy Association with the PCF and to get the PCC rules for the corresponding PDU Session. These requests may comprise an indication to the number of Packet Filters supported by the UE QQ701, for example using an attribute NumOfPackFilter.

The PCF QQ708 responds QQ809 by providing a SMPolicyControl_Create response or SMPolicyControl_Update response message indicating the policy decisions, including the number of packet filters of signaled QoS rules of the PDU session.

The present disclosure is directed to a step that is performed by the SMF QQ707 trigged by the above described response message. That is, the SMF QQ707 validates QQ810 that the number of packet filters of the signaled QoS rules of the PDU session does not exceed the initially provided number of Packet Filters supported by the UE QQ701. If the validation fails, i.e. if the number of packet filter of the signaled QOS rules of the PDU session does exceed the initially provided number of Packet Filters supported by the UE QQ701, the SMF may provide an indication that such a failure has occurred.

This may, for example, be reported in that PCC rules are set as inactive with a failureCode set to "MAX_NR_PACKET_FILTERS_EXCEEDED". This may be reported as indicated by the reference numeral QQ811, for example as shown in the table below.

| Enumeration value | Description | Applicability |
|---|---|---|
| . . .<br>MAX_NR_PACKET_FILTERS_EXCEEDED | Indicates that the PCC rule could not be successfully installed (for those provisioned from the PCF) or updated (for those already successfully installed) due to the fact that the maximum number of packet filters of the PDU session has been reached. | |

If the AMF QQ705 does not have an association with an SMF QQ707 for the PDU Session ID provided by the UE QQ701, for example when Request Type indicates "initial request", the AMF QQ705 may invoke the Nsmf_PDUSession_CreateSMContext Request QQ802, but if the AMF QQ705 already has an association with an SMF QQ707 for the PDU Session ID provided by the U QQ701, for example Finally, the PCF QQ708 may respond with adjusted policy decisions, as indicated with reference numeral QQ812 and the PDU Session Establishment procedure QQ804 or the PDU Session Modification procedure QQ805 may continue QQ813.

One of the advantages of the above described procedure is that in case the number of packet filters of all signaled QoS rules has reached the maximum number of supported packet filters indicated by the UE QQ701, the SMF QQ707 can generate a PCC rule error report with the specific failure code, so that the PCF QQ708 is aware of the situation and can adjust the policy decision accordingly.

Particularly, if the PCF provides new or modified PCC rules to the SMF and if the number of packet filters for the provided PCC rules exceeds the value included within the "numOfPackFilter" attribute, the SMF may reject the installation of the affected PCC rules based on operator policies until the limit is reached and include a "ruleReports" attribute containing a RuleReport data instance which specifies the affected PCC rules within the "pccRuleIds" attribute, the status of the PCC rule as "INACTIVE" as the value within the "ruleStatus" attribute and the "MAX_NR_PACKET_FILTERS_EXCEEDED" as the value of the "failureCode" attribute.

Further, when the UE establishes a PDN connection through the 5GS network in an 5GS-EPC interworking deployment, and if the feature "FilterPreservation" is supported, the PCF may provide, as part of the PCCRule data type(s) for the PCC Rules to be installed, the "packFiltPrsv" attribute to indicate that the packet filters should be preserved when the UE moves to the EPC network. The PCF can ensure that, for all the dynamic PCC rules of the PDU session, the number of preserved packet filters contained within the "flowDescription" attribute or the "ethFlowDescription" attribute with the "packetFilterUsage" set to true does not exceed the value of the maximum number of supported packet filters in EPS. If the number of packet filters for PCC Rules that include the "packFiltPrsv" attribute set to true exceeds the this value, the SMF+PGW–C based on operator policies may:

reject the installation of the PCC rules selected based on operator policies until the maximum number of active filters does not exceed the limit and include the "ruleReports" attribute containing the RuleReport data instance which specifies the affected PCC rules within the "pccRuleIds" attribute, set to "INACTIVE" as the value within the "ruleStatus" attribute and the "MAX_NR_PRSV_PACKET_FILTER" as the value of the "failureCode" attribute; or accept the installation of the affected PCC rules but set the "packFiltPrsv" attribute as false for those PCC rules selected based on operator policies until the maximum number of active filters does not exceed the limit and include the "ruleReports" attribute containing the RuleReport data instance which specifies the affected PCC rules within the "pccRuleIds" attribute, set to "ACTIVE" as the value within the "ruleStatus" attribute and the "MAX_NR_PRSV_PACKET_FILTER" as the value of the "failureCode" attribute.

Further, when the UE has an established PDN connection through the 5GS network in an 5GS-EPC interworking deployment, if the feature "FilterPreservation" is supported, the PCF may provide, as part of the PccRule data type for the PCC Rules to be installed/modified, the "packFiltPrsv" attribute to indicate that the packet filters should be preserved when the UE moves to the EPC network. The PCF shall ensure that, for all the dynamic PCC rules of the PDU session, the number of preserved packet filters contained within the "flowDescription" attribute or the "ethFlowDescription" attribute with the "packetFilterUsage" set to true does not exceed the value maximum number of supported packet filters in EPS. If the PCF provides new/modified PCC Rules and the final number of installed packet filters for PCC Rules that include the "packFiltPrsv" attribute exceeds the value of the maximum number of supported packet filters in EPS, the SMF+PGW–C based on operator policies may:

reject the installation of PCC rules that include "packFiltPrsv" attribute set to true selected based on operator policies until the maximum number of active filters does not exceed the limit and include the "ruleReports" attribute containing the RuleReport data instance which specifies the affected PCC rules within the "pccRuleIds" attribute, the status set to "INACTIVE" as the value within the "ruleStatus" attribute and the "MAX_NR_PRSV_PACKET_FILTER" as the value of the "failureCode" attribute.

accept the installation of new PCC rules that include that attribute set to true selected based on operator policies until the maximum number of active filters does not exceed the limit and include the "ruleReports" attribute containing the RuleReport data instance which specifies the affected PCC rules within the "pccRuleIds" attribute, the status set to "ACTIVE" as the value within the "ruleStatus" attribute and the "MAX_NR_PRSV_PACKET_FILTER" as the value of the "failureCode" attribute.

Further, when the UE handed over from 5GS to EPC/E-UTRAN and if the feature "FilterPreservation" is supported, the SMF-PGW-C may send an HTTP POST request to the PCF as follows:

the SMF+PGW-C shall include the "NUM_OF_PACKET_FILTER" within the "repPolicyCtrlReqTriggers" attribute and the number of supported packet filters within the "numOfPackFilter" attribute set to the maximum number of supported packet filters in EPS.

The SMF+PGW-C shall check whether the number of active packet filters exceeds the number of supported filters in the EPC network. If this is the case, the SMF+PGW-C shall remove the PCC rules that do not include the "packFiltPrsv" attribute set to true and include the "ruleReports" attribute containing the RuleReport data instance which specifies the affected PCC rules within the "pccRuleIds" attribute, the status set to "INACTIVE" as the value within the "ruleStatus" attribute and the "PACKET_FILTER_NOT_PRESERVED" as the value of the "failureCode" attribute.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method performed by a session management function, SMF, in a service based architecture, SBA, network for handling packet filters related to a session of User Equipment, UE, in the SBA network, the method comprising the steps of:

transmitting, by the SMF, to a Policy Control Function, PCF, in the SBA network, a policy control request in relation to the session of the UE with the SBA network;

receiving, by the SMF, from the PCF, a policy control response, the policy control response comprising applicable packet filters for the session of the UE with the SBA network;

determining, by said the SMF, that a number of the applicable packet filters received from said the PCF exceeds a number of packet filters supported by said the UE; and transmitting, by the SMF, to the PCF, an update message with rule report comprising a failure code indicating that at least one of the applicable packet filters cannot be installed or updated due to that a maximum number of packet filters has been reached.

2. The method in accordance with claim 1, wherein the first transmitting step is performed as a consequence of a PDU session establishment request message transmitted by the UE.

3. The method in accordance with claim 2, wherein the number of packet filters supported by the UE is indicated in the PDU session establishment request message or the PDU session modification request message transmitted by the UE.

4. The method in accordance with claim 2, further comprising the step of:

marking, by the SMF, affected Policy and Charging Control, PCC, rules with packet filters not installed or updated, due to that a maximum number of packet filters has been reached, as inactive, wherein the update message with rule report also comprises the PCC rules marked as inactive.

5. The method in accordance with claim 2, further comprising the step of:

receiving, by the SMF, from the PCF, an updated policy decision determined by the PCF.

6. The method in accordance with claim 1, wherein the first transmitting step is performed as a consequence of a PDU session modification request message transmitted by the UE.

7. The method in accordance with claim 6, further comprising the step of:

marking, by the SMF, affected Policy and Charging Control, PCC, rules with packet filters not installed or updated, due to that a maximum number of packet filters has been reached, as inactive, wherein the update message with rule report also comprises the PCC rules marked as inactive.

8. The method in accordance with claim 6, further comprising the step of:

receiving, by the SMF, from the PCF, an updated policy decision determined by the PCF.

9. The method in accordance with claim 1, further comprising the step of:

marking, by the SMF, affected Policy and Charging Control, PCC, rules with packet filters not installed or updated, due to that a maximum number of packet filters has been reached, as inactive, wherein the update message with rule report also comprises the PCC rules marked as inactive.

10. The method in accordance with claim 1, further comprising the step of:

receiving, by the SMF, from the PCF, an updated policy decision determined by the PCF.

11. A method performed by a Policy Control Function, PCF, in a service based architecture, SBA, network for handling packet filters related to a session of User Equipment, UE, in the SBA network, the method comprising the steps of:

receiving, by the PCF, from a Session Management Function, SMF, in SBA network, a policy control request in relation to a session of a User Equipment, UE, with the SBA network;

transmitting, by the PCF, to the SMF, a policy control response, the policy control response comprising applicable packet filters for the session of the UE with the SBA network; and receiving, by the PCF, from the SMF, an update message with rule report comprising a failure code indicating that at least one of the applicable packet filters cannot be installed or updated due to that a maximum number of packet filters supported by the UE has been reached.

12. The method in accordance with claim 11, wherein the policy control request in relation to a session of a UE with the SBA network is received from the SMF as a consequence of a PDU session establishment request message or a PDU session modification request message transmitted by the UE.

13. The method in accordance with claim 12, wherein the number of packet filters supported by the UE is indicated in the PDU session establishment request message or the PDU session modification request message transmitted by the UE.

14. The method in accordance with claim 12, wherein the received update message with rule report also comprises affected Policy and Charging Control, PCC, rules with packet filters not installed or updated, due to that a maximum number of packet filters has been reached, marked as inactive by the SMF.

15. The method in accordance with claim 12, further comprising the step of:

transmitting, by the PCF, to the SMF, an updated policy decision determined by the PCF.

16. The method in accordance with claim 7, wherein the received update message with rule report also comprises affected Policy and Charging Control, PCC, rules with packet filters not installed or updated, due to that a maximum number of packet filters has been reached, marked as inactive by the SMF.

17. The method in accordance with claim 11, further comprising the step of:

transmitting, by said the PCF, to said the SMF, an updated policy decision determined by the PCF.

18. A network node in a service based architecture, SBA, network, for handling packet filters related to a session of User Equipment, UE, in the SBA network, the network node comprising:

processing circuitry configured to:

transmit, to a Policy Control Function, PCF, in the SBA network, a policy control request in relation to the session of the UE with the SBA network;

receive, from the PCF, a policy control response, the policy control response comprising applicable packet filters for the session of the UE with the SBA network;

determine that a number of the applicable packet filters received from the PCF exceeds a number of packet filters supported by the UE; and transmit, to the PCF, an update message with rule report comprising a failure code indicating that at least one of the applicable packet filters cannot be installed or updated due to that a maximum number of packet filters has been reached; and power supply circuitry configured to supply power to the processing circuitry.

19. A network node in a service based architecture, SBA, network, for handling packet filters related to a session of User Equipment, UE, in the SBA network, the network node comprising:

processing circuitry configured to:

transmit, to the SMF, a policy control response, the policy control response comprising applicable packet filters for the session of the UE with the SBA network; and receive, from the SMF, an update message with rule report comprising a failure code indicating that at least one of the applicable packet filters cannot be installed or updated due to that a maximum number of packet filters supported by the UE has been reached; and power supply circuitry configured to supply power to the processing circuitry.

\* \* \* \* \*